March 16, 1971 D. W. ACKERMAN ET AL 3,570,099
UNIT CARRIER LOADER
Filed Feb. 7, 1969 9 Sheets-Sheet 3

INVENTORS
DANIEL W. ACKERMAN
ROBERT H. HOLMES
ALBERT W. ZEMEK
BY Fidelman, Wolffe & Leitner

ATTORNEYS

FIG. 15

March 16, 1971   D. W. ACKERMAN ET AL   3,570,099
UNIT CARRIER LOADER
Filed Feb. 7, 1969   9 Sheets-Sheet 8

INVENTORS
DANIEL W. ACKERMAN
ROBERT H. HOLMES
ALBERT W. ZEMEK
BY Sidelman, Wolffe & Leitner

ATTORNEYS

United States Patent Office 3,570,099
Patented Mar. 16, 1971

3,570,099
UNIT CARRIER LOADER
Daniel W. Ackerman, Chenango Bridge, Robert H. Holmes, Marathon, and Albert W. Zemek, Binghamton, N.Y., assignors to Universal Instruments Corporation, Binghamton, N.Y.
Filed Feb. 7, 1969, Ser. No. 803,524
Int. Cl. H05k 3/30, 13/04
U.S. Cl. 29—203     38 Claims

ABSTRACT OF THE DISCLOSURE

An apparatus and process for inserting dual in-line lead electrical components into unit carriers having a slotted rotating index wheel with work stations located around the periphery thereof including separate feed mechanisms for the components and carriers, lead forming and straightening dies, a sensing photo-cell assembly, an inserting plunger and two magazines for receiving the loaded carriers. The work stations are powered by pneumatic cylinders operated by a control system which is timed by cams and switches on the index wheel drive train which contains a Geneva drive train to index the wheel to a new work station for each revolution of a pneumatically driven motor. The device feeds the components and carriers to the index wheel where the component leads are straightened, the component is loaded into the carrier and the filled carrier is loaded into a magazine.

---

This invention relates to an automatic assembly apparatus for placing dual in-line package modules with leads extending from opposite sides thereof into unit carriers in a manner insuring proper alignment and loading the assembled combination into magazines.

Electrical components such as Integrated Circuits are commonly mass produced having a generally rectangular body with multiple leads extending from either side thereof. As shown in broken view in FIG. 19, such components have an elongated body 1 with leads 2 extending from the sides 3 thereof and bent to form two parallel sets of leads.

To handle such components, a unit carrier is employed which facilitates testing and handling of such components without subjecting the components to the possibility of damage to the body and leads or misalignment of the leads. The typical unit carrier is shown in broken cross-section in FIG. 19 as 5 and is generally rectangular and open at the top and bottom and having a flange 6 extending around the sides thereof with positioning notches 7. The long sides have flange portions 8 at the tops thereof enabling the carriers to be stacked. On the inner surfaces of the sides are slots 9 adapted to receive the leads 2 of the components upon pushing the component up into the carrier. A more detailed explanation of the components and carriers is found in copending application Ser. No. 761,229, filed Sept. 20, 1968, by Daniel W. Ackerman.

One of the problems encountered in using unit carriers to handle components has been that of inserting the components into the carriers. Prior to this invention, insertion was performed by hand or with clumsy and awkward hand tools. Ofter the component was not correctly placed in the carrier or else the leads were not formed properly resulting in a high rate of rejections at a testing station or damage to the component and the inserting machine when the component is plunged into a circuit board. Also, the rate of insertion by previously known methods was too time consuming resulting in a slow production rate of loaded carriers. Further, testing for alignment of the component and its body after insertion created slower production rates. Thus, industry needed an apparatus capable of making a perfect insertion that would practically insure that the component would be inserted correctly into a unit carrier and that the component leads would be parallel.

It is a general object of the present invention to provide a machine and process that will meet all of the above desiderata.

A more specific object of the present invention is to provide a machine for accurately inserting electrical components into unit carriers.

Another object of the present invention is the provision of a machine to form and straighten leads on an electrical component having leads extending from both sides thereof in a generally parallel direction, and insert said components into unit carriers.

A further object of the present invention is to provide a machine for inserting unit carriers loaded with electrical components into magazines to be used directly on insertion machines.

A still further object of the present invention is to provide a rotary index wheel having work stations around its peripheral edge to accept components, form and straighten the leads of said components, insert the components into unit carriers and insert the loaded carrier into magazines.

Other objects and the nature and advantages of the present invention will be apparent from the following description taken in conjunction with the accompanying drawings, wherein:

FIG. 10a is a cross-sectional side view of the index wheel of FIG. 10 taken along lines 10a—10a;

Referring to the drawings the machine is supported by a frame A on which the index wheel and the various work stations are mounted. The index wheel and supporting member, the work stations, the drive mechanism and the pneumatic control system will now be discussed in detail.

INDEX TABLE

Figure 1:
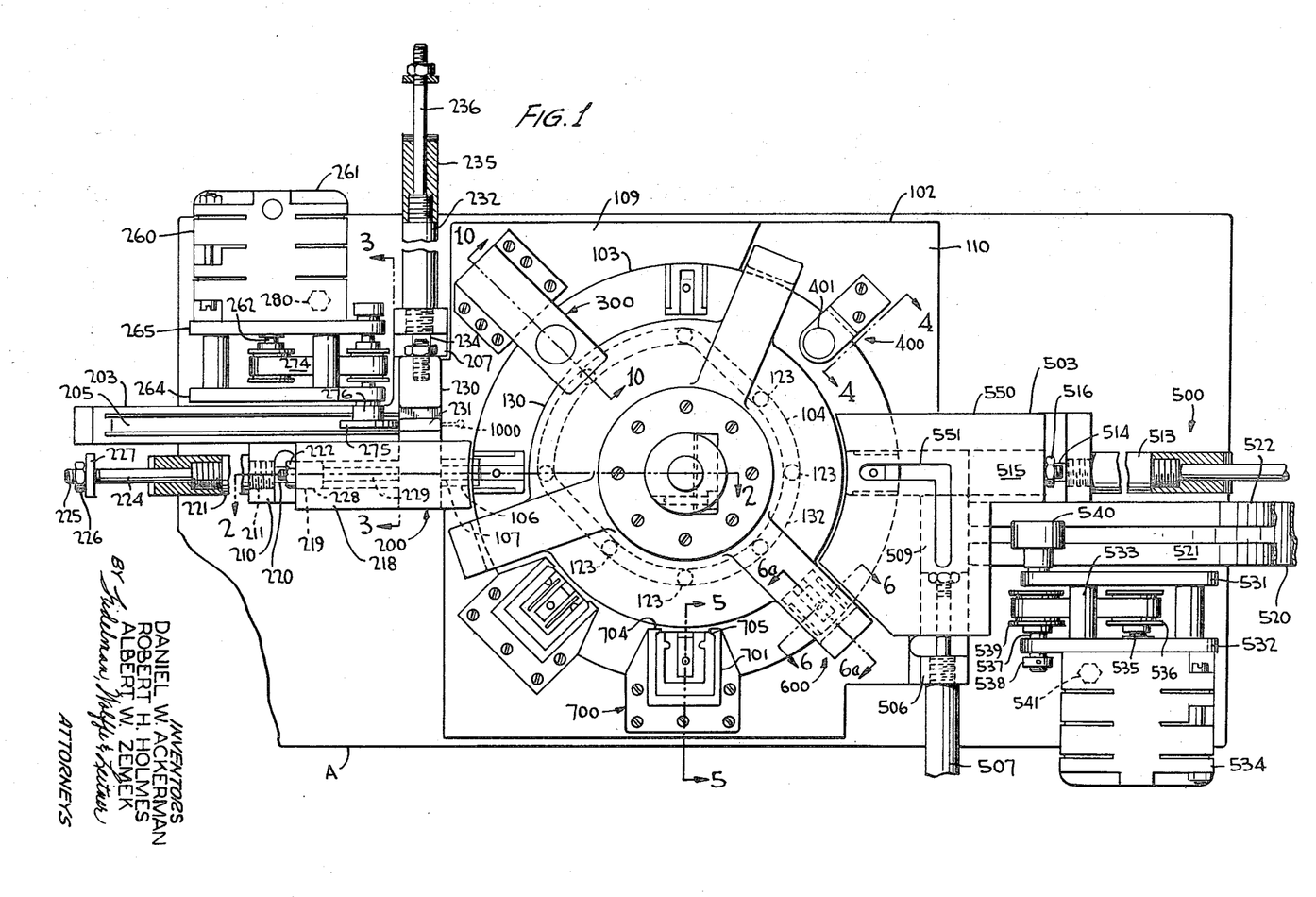
FIG. 1 is a plan view of the insertion machine showing the index wheel and work stations.
Figures 2, 3, 4, 5:
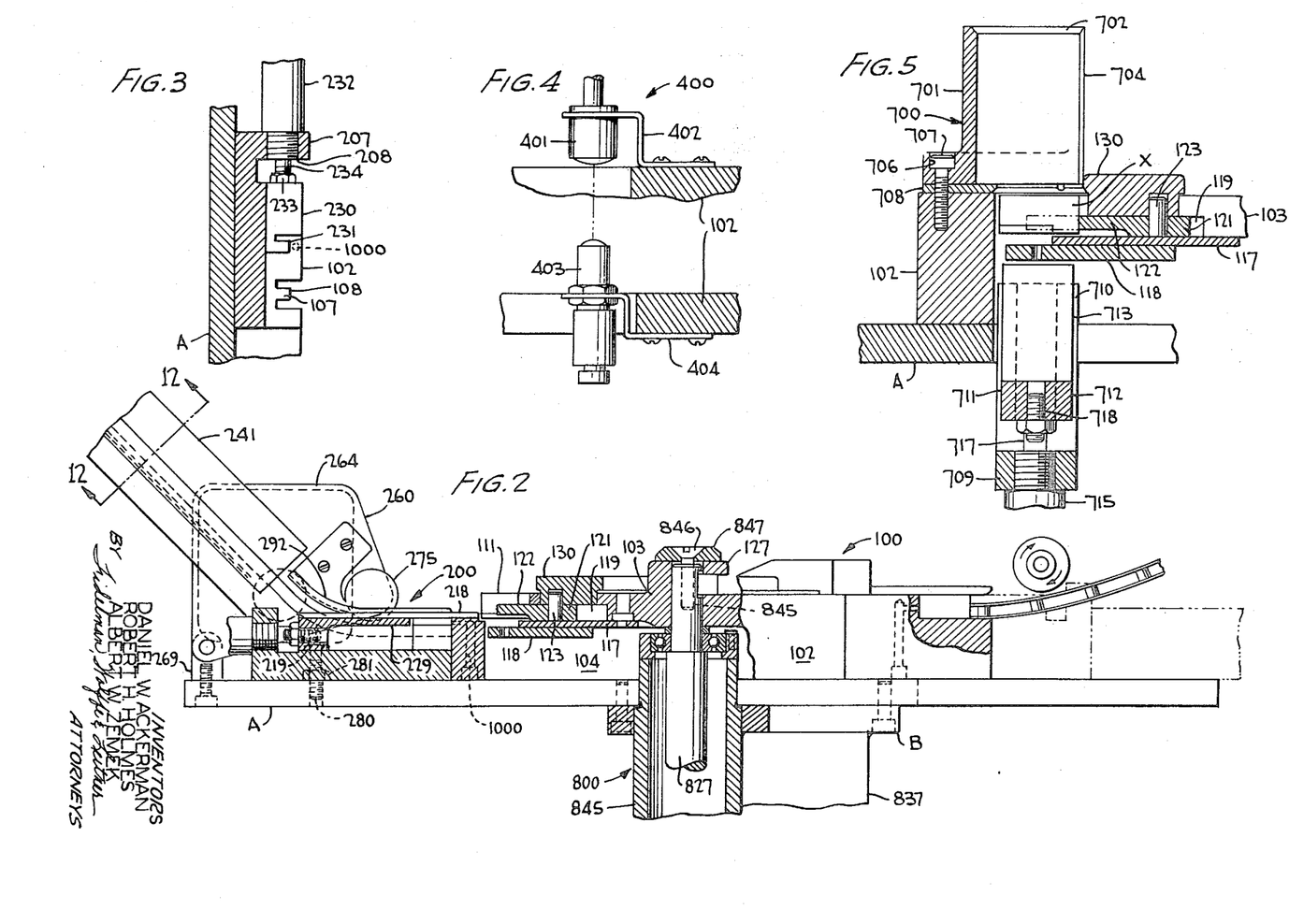
FIG. 2 is a side view of a partial section of FIG. 1 taken along lines 2—2 showing only a portion of the unit carrier feed assembly.
FIG. 3 is a partial side section view of the transfer bar of the component feed assembly taken along lines 3—3 in FIG. 1.
FIG. 4 is a side view of a section of the machine showing the photo cell assembly taken along lines 4—4 of FIG. 1.
FIG. 5 is a side view of the section of the magazine ejection assembly taken along lines 5—5 of FIG. 1.

The index table and wheel is generally designated as 100 in FIGS. 1 and 2. It consists of a wheel support member 102 and an index wheel 103.

Figure 21:
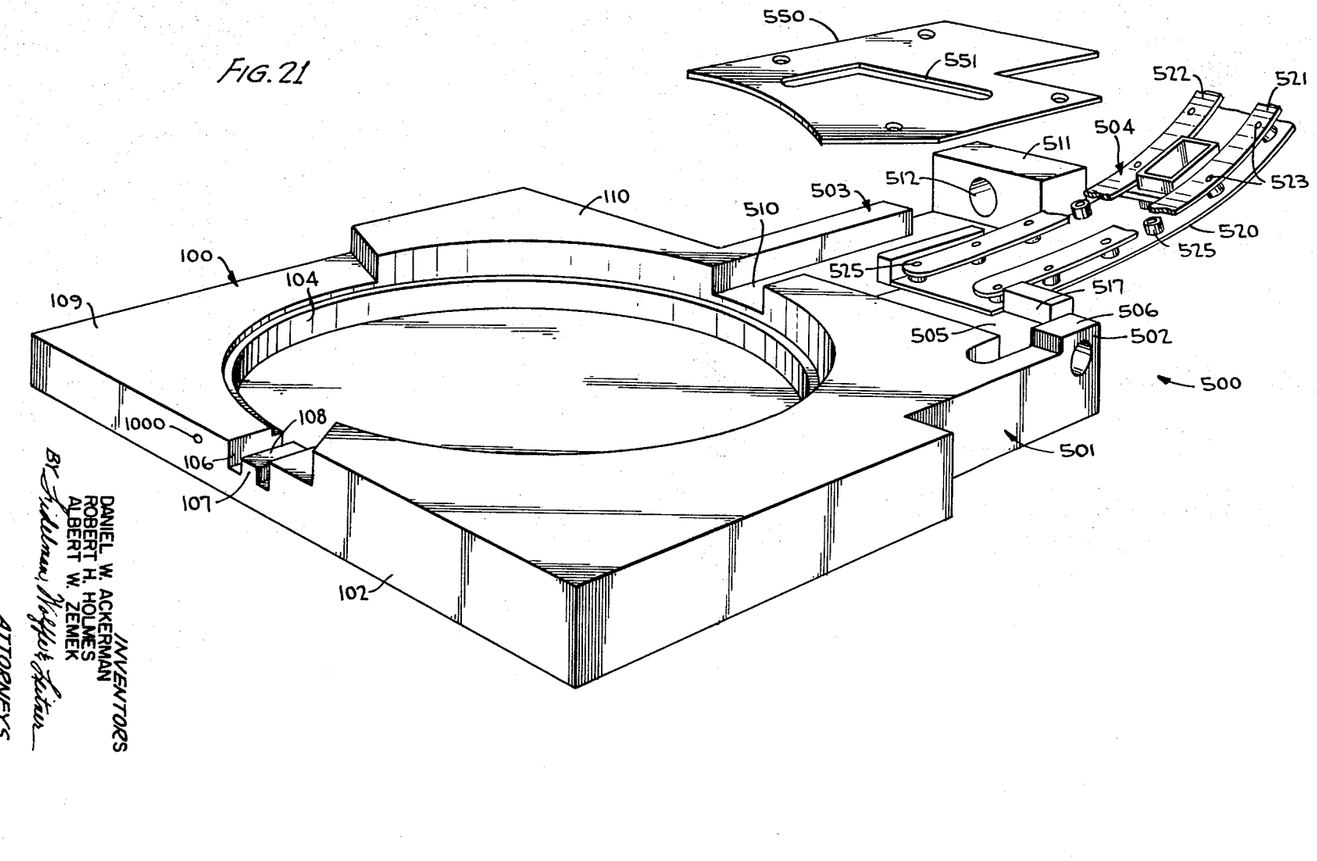
FIG. 21 is a perspective view of the index wheel support member and the support member for the carrier feed mechanism showing the cover plate in exploded view.
Figure 22:
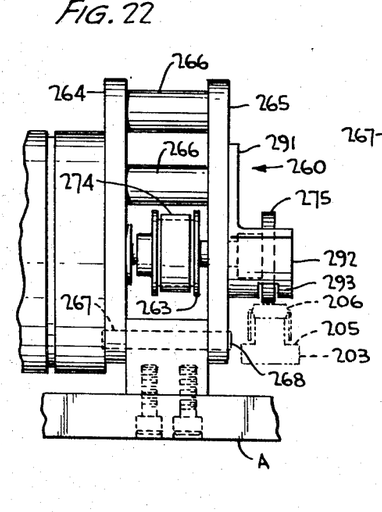
FIG. 22 is a partial end view of the motor and ejecting wheel of the component feed mechanism.
Figure 23:
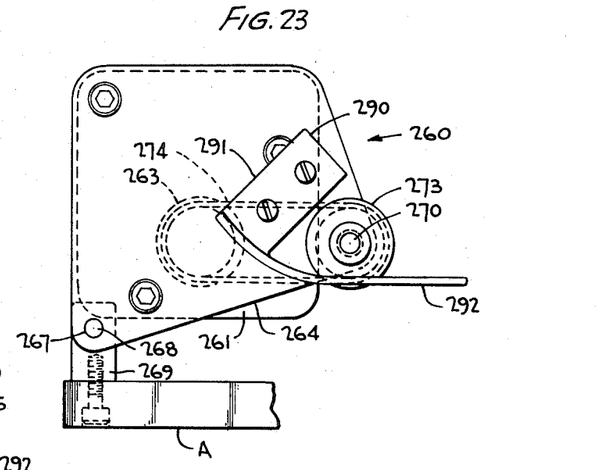
FIG. 23 is a side view of the motor and weel of FIG. 22.

Member 102 is best shown in FIG. 21. It can be a unitary casted member as shown or built up of sheet stock. It has a central opening 104 substantially in the center thereof which is ridged as at 105. Ridge 105 continues substantially all the way around the inner opening 104. A substantially rectangular channel 106 is located on one side of member 102 and has a centrally located, generally rectangular projection 107. Channel 106 allows a component fed from feed assembly 200 to be forced from the feed assembly onto index wheel 103. As a component is pushed through channel 106 the body portion rides on the top surface 108 of projection 107 with the leads extending down along the sides thereof. As is apparent from FIG. 21, member 102 has a reduced portion 109, having a lower surface than the top surface 110. The purpose of the reduced portion 109 is to position the lead forming and straightening station 300 on a lower level relative to wheel 103 since at that point of operation only the component is located on the wheel.

Directly opposite channel 106 is channel 510 for feeding unit carriers onto wheel 103 at a level higher than the components are fed onto it. The carrier feed structure and operation will be described later.

Figures 6, 6A, 18, 19:
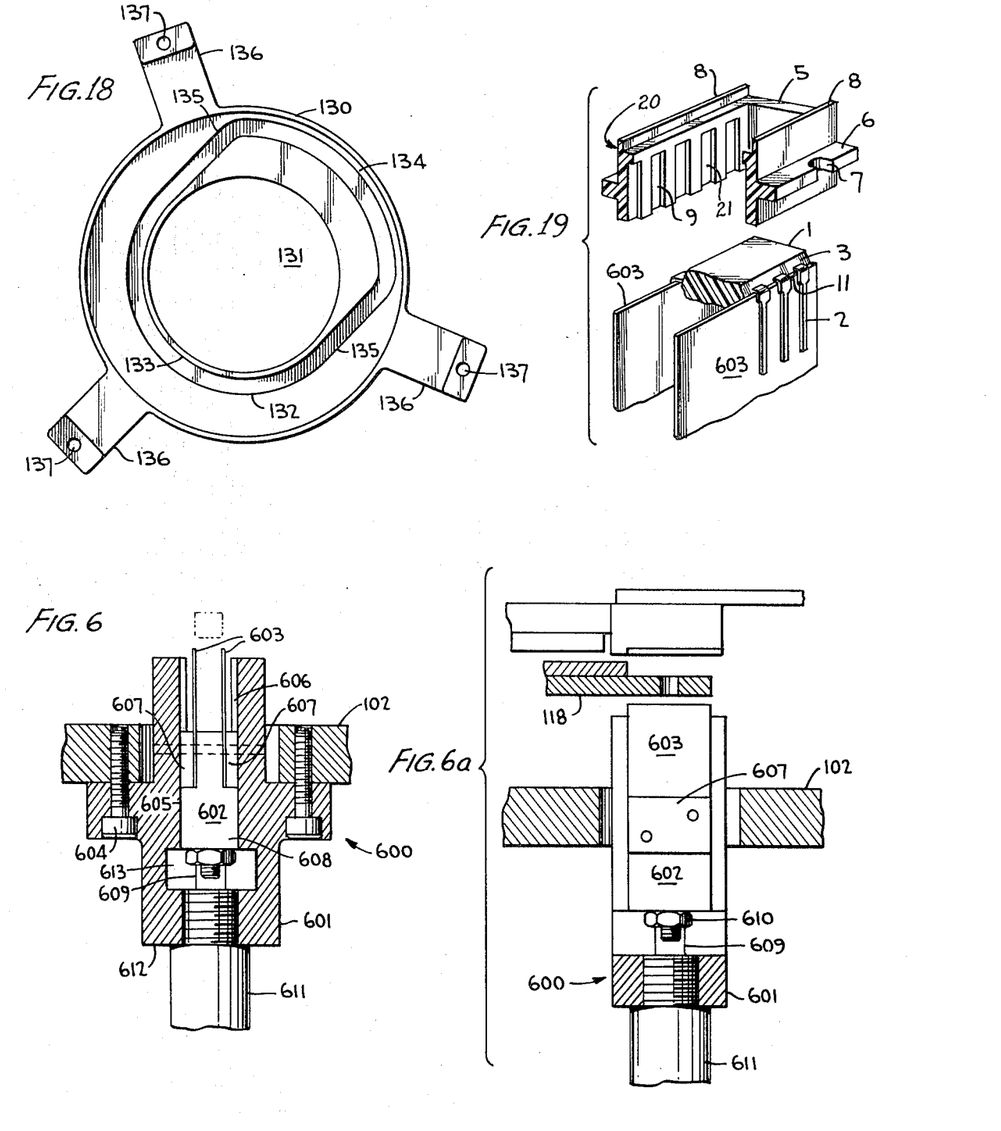
FIG. 6 is a cross-sectional partial view of the inserting mechanism taken along lines 6—6 of FIG. 1.
FIG. 6a is a cross-sectional view of the inserting mechanism taken along lines 6a—6a of FIG. 1.
FIG. 18 is a bottom plan view of the cam plate which is mounted over the index wheel.
FIG. 19 is a partial perspective view of a component and carrier in cross-section showing how the arms of the insertion member engages the component the leads of the component being shown as vertical for purposes of illustration.
Figure 10:
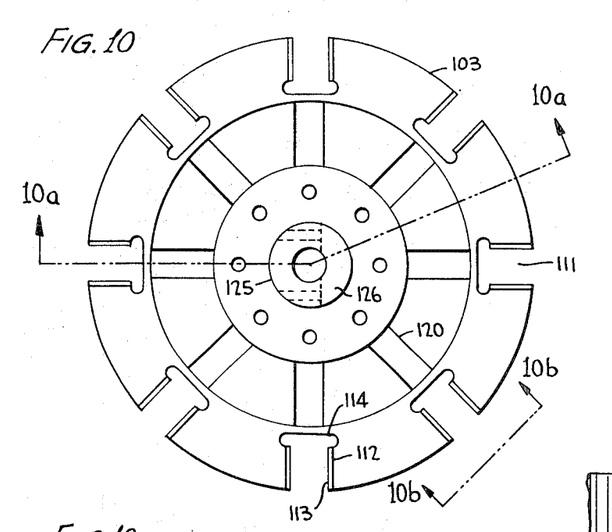
FIG. 10 is a top plan view of the index wheel showing the peripheral slots for retaining components and carriers.
Figure 10A:
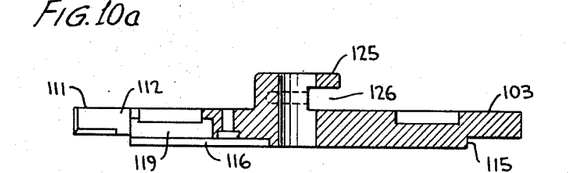
Figure 10B:
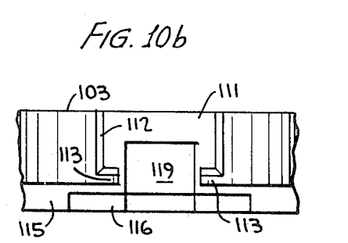
FIG. 10b is a partial view of the side of the index wheel taken along lines 10b—10b in FIG. 10.

Index wheel 103, as shown in FIGS. 10, 10a and 10b, is a circular plate with slots 111 in the peripheral edge thereof. Slots 111 are generally rectangular in end view and have straight parallel side walls 112. The lower portions of slots 111 are open except for flanges 113 at the base of side walls 112. Flanges 113 are for engaging the flanges of a unit carrier, as shown in FIG. 19, and preventing the carriers from falling through slots 111. The inner ends 114 of slots 111 are formed by drilling out the plate and then cutting to the center of the drill holes.

On the other side of wheel 103 is a flange 125 having a keying slot 126 for attaching wheel 103 to shaft 827 by means of a bolt. Shown in FIG. 2 is key member 127 secured to flange 125 by means of a bolt 128 or the like.

Provided on the undersurface of the wheel 103 is a flanged portion 115. Portion 115 is of lesser diameter than the wheel 103 to allow for electrical components to be held in place under the slots 111 as the wheel turns.

Also located on the undersurface of wheel 103 are a series of eight cutaway areas 116 for attachment of fastening plates 117 and rail members 118, shown on the wheel in FIG. 2. Rail members 118 are secured to the underside of fastening plates 117. A series of channels 119 are located inwardly of each slot 111 with their bases opening into channels 119. Channels 119 are generally rectangular in end view as shown in FIG. 10b. A smaller series of radially extending and generally rectangular chambers 120 are formed above each channel 119, the top of each chamber opening onto the uppermost surface of wheel 103 and the bottom of each chamber opens into an adjacent channel 119.

As best shown in FIGS. 2 and 5, a holddown member 121 is positioned within each channel 119 for radial movement therein. Each member 121 has a raised horizontal extending projection 122 thereon which is adapted to slide over the top of a component body and hold it in place. Each holddown member 121 has a cam follower stud 123 mounted therein. In FIG. 2 the holddown member 121 is shown as extending but over the extremity of rail 118 so as to hold a component body between it and the rail. In FIG. 5, the member 121 is shown as retracted, the extended position being shown in dotted lines.

Figure 16:
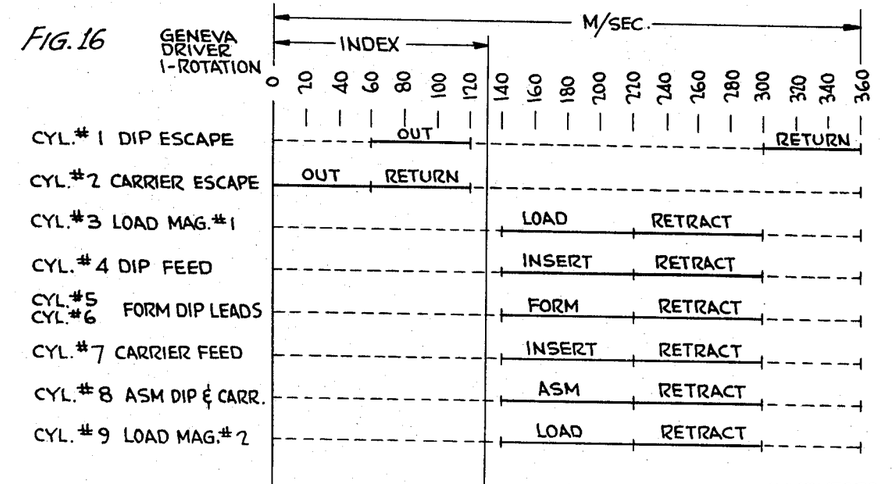
FIG. 16 is a timing chart indicating the sequence of the operations in an index wheel cycle.

Mounted on top of wheel 103 is a circular cam plate 130, the bottom view of which is shown separately in FIG. 16. The center portion of the plate is cut out as at 131 to allow for flange 125. Cut into the undersurface of plate 130 is a channel 132. As shown in FIG. 18, the channel has an arcuate portion 133 of small radius, an arcuate portion 134 of larger radius and straight portions 135 connecting the two arcuate portions. Located around the periphery of plate 130 are attachment members 136 with holes 137 in the ends thereof adapted to receive bolts to attach the cam plate to index wheel support member 102.

As shown in FIG. 1, the cam plate 130 is mounted onto member 102 so that arcuate portion 134 of channel 132 is located adjacent the component feed station 200 and the lead forming and strategy station 300. It is also located adjacent the dummy work station. At the stations just mentioned, the holddown member 121 is extended to secure the components rigidly in place as indicated by the dotted lines in FIG. 1 showing the channel 132 and the position of the hold down member studs 123 at every work station. Thus, it is seen that as the index wheel turns, the hold down members advance, retract or maintain their position.

An alternate module or component holding mechanism (not shown) indicates a pair of spring loaded jaws pivotally joined at one end and secured at said end to the index wheel under each component holding slot. The jaws are elongated and the jaw portions define a generally rectangular opening adapted to surround the body of the component and keep it on rail member 118. In a side view of the index wheel, the jaws would be mounted slightly above the rail member 118. Between the jaw portions and the pivoted end portions, the jaws are kept from abutting by a vertically slideable dowel pin with a small diameter cylindrical portion riding between the jaws. Adjacent the cylindrical portion of the down pin is a tapered portion flaring out to the larger diameter of the dowel pin base. The jaws are opened at the component feed station by a piston mounted under member A driving against a punch mounted for vertical movement in member A, which in turn pushes up the dowel member and separates the jaws, which are biased closed normally by springs so that a component may be horizontally fed onto member 118. After the component is fed onto member 118, the wheel 103 indexes to the next work station. As the wheel indexes, the bottom of the dowel which is flanged, engages a stationary cam having an arcuate inclined section which retracts the dowel pin down thereby allowing the jaws to close and grip the component.

Passageways 1000, as shown in FIG. 2, may be used to convey air against an area to be occupied by a component on slide 230 (later to be described) for the purpose of activating a back pressure sensing mechanism. The mechanism (not shown) can be designed to stop the machine after one revolution when the absence of a component on the slide eliminates back pressure in the passageway.

COMPONENT FEED

Figure 20:
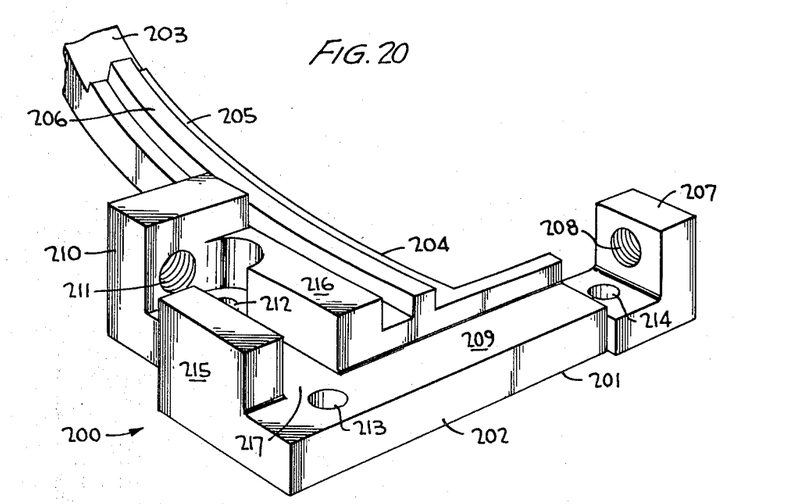
FIG. 20 is a perspective view of the support member for the component feeding mechanism.

The modules (DIPS) are fed into the system by a magazine, a bowl feed mechanism or by any other suitable means. The means shown for purposes of illustration is a magazine. The overall mechanism is designated as 200 in FIGS. 1 and 2. Referring to FIG. 20, the mechanism consists of a feed block 201 having a base portion 202 and a magazine support member 203. Member 203 is essentially a rectangular bar which, as shown in FIG. 20, curves slightly at its base and merges into base portion 202 as at 204. A rectangularly shaped raised portion 205 is provided on the lower portion of the upper surface of member 203 and extends to the lower end thereof. A rectangularly-shaped raised rail 206 is provided on top of raised portion 205 and is located centrally thereof. Rail 206 provides a track for modules to slide down with their leads extending down either sides thereof. An L-shaped extension piece 207 is provided on one end of base member 202 for attachment of cylinder No. 1 thereto. Hole 208 is for mounting the cylinder therein. Surface 209 is a guiding plane for slide 230 (see FIG. 1) operated by cylinder No. 1. A second L-shaped extension piece 210 is formed to the rear of block 202 and is adapted for holding cylinder No. 4, the module feed cylinder. Hole 211 is adapted to receive a threaded or force fitted cylinder housing flange. Holes 212, 213 and 214 are for fasteners securing the feed block to the main assembly. Raised sections 215 and 216 form a channel 217 therebetween for guiding a module feed slide 219 operated by cylinder No. 4.

As seen in FIGS. 1 and 2, a cover plate 218 is mounted over sections 214 and 215 covering the channel 217 and extending over surface 209 out to the edge of the index wheel 103. Within channel 217 a pusher 219 is connected to a piston rod 220 which in turn is connected to a cylinder housing 221 mounted in L-shaped extension piece 210. A nut 222 securely locks rod 220 to pusher 219. The cylinder housing is shown in broken view to facilitate showing the stop mechanism 223 on the other end of the housing. Rod 224 extends from the stop mechanism 223 rearwardly and is threaded as at 225 at its extremity. Mounted on the threaded end is an adjustment nut 226 and a washer 227 for adjusting the length of stroke of cylinder No. 4 and the pusher 219 operated thereby.

Mounted on surface 209 of the feed block is a module transfer slide 230, seen in profile in FIG. 3. Slide 230 has an L-shaped end portion 231 which has the transverse dimensions of rail 205 on the feed block. When modules are fed down track 205, they continue on until they rest on portion 231, stopping when they hit member 102. Slide 230 is connected to a piston rod 234 which, in turn, connects with the end of a cylinder housing 232 in L-shaped piece 207. A nut 233 secures rod 234 to slide 230. Cylinder housing 232 is part of cylinder No. 1 which has a stop mechanism 235 and rod 236 for adjusting the length of the stroke in a manner identical to that shown and described for cylinder No. 4.

Figure 12:
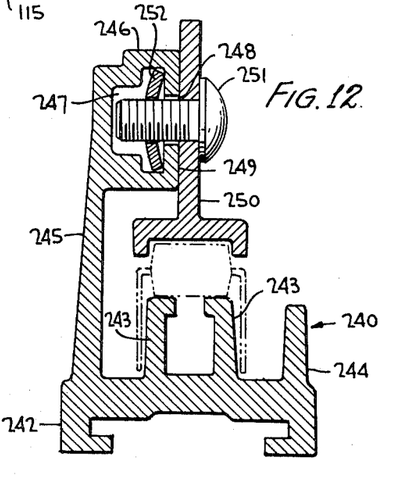
FIG. 12 is a cross-sectional view of the component feeding magazine taken along lines 12—12 of FIG. 2.

Mounted on magazine support member 203 is a magazine assembly 240, shown in cross-section in FIG. 12. It consists of a long web-like body member 241 which may be constructed out of aluminum or similar materials. It has a base section 242 which rests on top of support member 203. Two upstanding arms 243 forming a support for components are arranged on section 242. A module retaining section 244 is positioned on one edge of section 242 and on the other edge is a support flange 245. Flange 245 has a rail supporting section 246 located at its upper periphery, section 246 having a passageway 247 therein. A series of apertures 248 are located along the outer wall 249. Secured to the outer wall 249 is a rail member 250 of an inverted T configuration. Fasteners 251 and lock nuts 252 secure the rail to the outer wall. Arms 243 are of the same general configuration as rail 205 on feed block 201 so that modules may slide out of assembly 240 onto rail 205 ultimately onto portion 231 of slide 230. An extension member (not shown) projects from one end of assembly 240. The extension is shaped to mate with a standard commercially available module cartridge which fits onto the extension member. The assembly is designed to mate with most of the standard module cartridges produced. These cartridges vary in longitudinal, transverse and internal dimensions but all use some form of raised central portion to underlie and support the module body.

Located adjacent the feed block 201 is a drive assembly generally designated as 260 in FIGS. 1, 2, 22 and 23. The assembly consists of a motor 261 used as a stall motor with a drive shaft 262 extending therefrom. A sprocket 263 is keyed onto shaft 262. Mounted in front of motor 261 is a plate 264 of generally trapezoidal configuration (see FIG. 23) to which motor 261 is secured. A second plate 265, identical in configuration to plate 264, is located parallel to and spaced from plate 264 and is secured thereto by three spacers 266. Located in one lower corner of each plate is a hole 267 for receiving dowel pin 268. Dowel pin 268 extends through a block 269 and plates 264 and 265 are free to pivot on the ends thereof. In the other lowermost corner of plates 264 and 265 are apertures for receiving driven shaft 270. On one end of shaft 270 a collar 271 and a bushing 272 are positioned. Located between plates 264 and 265 and on shaft 270 is a second sprocket member 273 connected to sprocket 263 by a belt drive 274. Mounted on the opposite end of shaft 270 is a rubber wheel 275 with a flange 276. The wheel rotates counterclockwise as seen in FIG. 2. Modules sliding down rail 205 on feed block 201 are engaged by the wheel which accelerates them onto member 231 on slide 230.

The drive mechanism rests on pivot block 269 and on an adjustment screw 280 which is slidably received in assembly member 1 (see FIG. 2). An adjustment nut 281 is threaded onto screw 280 and the spacing of wheel 275 and its cover plate (to be described) from rail 205 can be adjusted by rotating nut 281 to move the drive assembly up or down.

A cover plate 290 is bolted onto the front face of plate 265. It consists of a bolting flange 291 and an arcuately bent flat plate 292 which generally follows the curvature of rail 205. The plate, as shown in FIG. 2, extends out and over the member 231 of slide 230 to eliminate the chance of modules lifting off 231 after being fed in by wheel 276. Plate 290 also has a longitudinal slot 293 therein through which a portion of wheel projects. The modules on rail 205 are engaged by this portion of wheel 275.

Activation of cylinder No. 1 causes slide 230 over until member 231 with the module thereon is aligned with the feed slot 106 of wheel 100. Cylinder No. 4 is then activated causing slide 219 to move. As shown in FIG. 2, slide 219 is composed of a main body section 228 and an extension 229 aligned with member 231 so that it slides over the top of 231 and pushes the module resting thereon off and into the feed slot 106.

COMPONENT LEAD FORMING AND STRAIGHTENING

Figure 11:
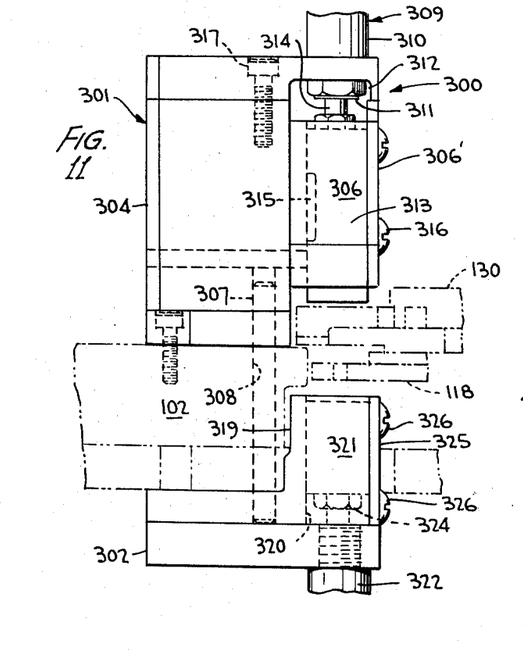
FIG. 11 is a side view of the forming and straightening mechanism showing the arrangement of the punch and die blocks.

The lead forming means 300, as depicted in FIG. 11, consists of a pair of cylinder guide members 301 and 302 Guide member 301 is mounted on support piece 102 by means of bolts such as 303 and consists of a main section 304, a top section 305 and a die holder 306. Main section 304 has an opening 307 at the bottom thereof for receiving a dowel pin 308 which extends from a position in member 301 through support piece 2 and assembly piece 1 and into member 302. Passing through top section 305 is the cylinder mechanism 309 for air cylinder No. 5. Mechanism 309 has a cylinder housing 310 with a threaded end portion 311 at the lowermost extremity. A nut 312 secures cylinder housing 310 to the top section 305. Located within die holder 306 is a lead straightening form die 313. Die 313 is mounted for vertical sliding movement within die holder 306 and is attached at its uppermost end to piston rod 314. Die 313 has a slot 315 in one side thereof adapted to act in conjunction with a position stop (not shown) in the form of a stud mounted in die holder 306. Die holder 306 has a cover plate 306' which is attached by means of fastener bolts 316 passing through the plate on each side of the passageway for die 313 and into section 304. Top section 305 is secured to the main section 304 by means of bolts such as 317.

Support member 302 is mounted on member 102 by any suitable fastening means such as bolts (not shown). Member 102 has an aperture 318 located directly under die holder 306 of support member 301 through which passes the uppermost extremity 319 of member 302. Member 302 has a channel 320 therein which receives a lead bending punch 321. Connected to the undersurface of member 302 is a cylinder housing 322 for air cylinder No. 6. Housing 322 is connected to member 302 by any suitable means (not shown) such as by threading the end of the housing and member 302, or by a press fit, etc. Piston rod 323 extends up into channel or passageway 320 and is secured to the bottom of punch 321 by any suitable means such as by threading and a lock nut 324. Passageway 320 is formed by a channel in member 302 and a cover plate 325 secured to member 302 by fastener bolts 326. Members 301 and 302 have their respective passageways aligned and positioned so that the module on index wheel 103 is directly in line with the forming ends of die 313 and punch 321.

In FIGS. 13, 13a, 14 and 14a, die 313 and punch 321 are shown individually in front and side views. Die 313 is generally square and tapers in a transverse dimension as at 327 to tooth support arms 328. At the lowermost extremity of arms 328 are teeth 329. In the views shown, there are seven (7) teeth per arm, one for each lead on one side of a fourteen (14) lead module. It is understood, of course, that any number of teeth may be placed on die 313 to accommodate modules with more or less leads. A series of dies may be used with the invention, one for each type of module according to the number of leads, lead length, lead spacing and module body dimension. The inside surfaces of the teeth are tapered as at 330 approximately fifteen degrees (15°) from the vertcial. The teeth have parallel vertical side surfaces 331 and generally horizontal bottom surfaces 332. The arms 328 are separated by a space 333 to allow the teeth 329 to pass down along side of the module body and engage the module leads. The top surface 334 of die 313 contains a threaded hole 335 for engagement with the threaded end of piston rod 314.

The punch 321 has a generally square-sided lower section 336. The top section 319 is in the same transverse dimension as at 337 as taper 327 on die 313. The angle of inclination of the taper 337 is approximately 15°. Two bending punch arms 338 are formed by the tapered surface 337 and vertical surface 339. At the topmost sectors of surfaces 339, tapered surfaces 340 commence and continue to the substantially horizontal top surfaces 341 of arms 338. The angle off the vertical of tapered surfaces 340 is approximately 15°. Viewing punch 321 in front view in FIG. 14a, it is seen that arms 338 are notched to form a plurality of slots 342 with separating ridges 343. Ridges 343 have sloping side surfaces 344 at an angle of approximately 60° off the vertical. Slots 342 have a traverse dimension creating flat guiding surfaces 345. The ridge surfaces 344 extend above the guiding surfaces 345 so as to engage and separate the leads of the module prior to the leads engaging surfaces 345 as the punch moves upwardly under the module. Punch 321 has a vertical threaded hole at the bottom thereof for engagement with the threaded end of piston rod of cylinder housing 322.

At the onset of the lead bending and straightening operation, cylinder No. 6 is activated thus moving punch 321 up in passageway 320 of member 302. The ridge surfaces 344 engage the leads and separate them to the proper desired interval for insertion whereupon the ends of the leads engage surfaces 342. Further, upward movement of punch 321 bends the leads up and outwardly from the module body. Cylinder No. 5 is then activated which pushes die 313 down over the top of the module. The tapered surfaces 330 of teeth 329 engage the outer surfaces of the leads and force them against the flat surfaces 342 of punch 321. The die 313 continues in its downward movement while, simultaneously, punch 321. retracts. The leads of the module are thus bent between the teeth and the slots until the die 313 has passed down over the module which nestles in space 333. When die 313 has progressed downwardly to its fullest extent the leads on each side are parallel to each other and each set of leads is bent outwardly from the vertical to approximately 15 degrees which is the final pre-insertion position. The die is then retracted by cylinder No. 5 and the index wheel 103 moves the module onto the next station.

A photo-cell assembly is generally indicated as 400 in FIG. 1. It consists mainly of a photo-cell assembly 401 mounted by bracket 402 on top of support piece 102. Bracket 402 is reverse bent as shown in FIG. 4 to position the assembly above the index wheel 103 to allow for clearance. A lamp 403 is mounted to assembly piece 102 by a bracket 404. Lamp 403 is positioned directly under photo-cell assembly 401 and aligned therewith. When a module is rotated around by index wheel 103 to station No. 4, it is positioned so as to block any light emanating from lamp 403 from detection by assembly 401. When this occurs, a signal is transmitted to the carrier feed mechanism which then operates to feed a carrier onto the index wheel 103 when the module is rotated to that station. If there is no module in station 4, the photocell assembly picks up the light from lamp 403 and a signal is transmitted to carrier feed assembly 500 to stop the feed of a carrier on the next shift of index wheel 103.

CARRIER FEED ASSEMBLY

The carrier feed mechanism is generally designated as 500. The support structure 501 is an integral part of support piece 2 as shown in FIG. 21. The structure is composed of three basic substructures, the carrier escape slide structure 502, the carrier feed slide structure 503, and the carrier feed track 504. The escape slide structure consists of a slide channel 505 a blade 506, a cylinder housing 507 for cylinder No. 2, a piston rod 508 extending from said housing and into channel 505 and attached to escape slide 509. Slide 509 is rectangular in shape and of the same cross-section as channel 505.

The feed slide structure 503 consists of a slide channel 510, a cylinder attachment blade 511, with an aperture 512 for receiving the end of cylinder housing 513 for cylinder No. 7. A piston rod 514 extends from the end of housing 513 and connects with feed slide 515. A nut 516 locks the rod against movement within the slide. Wall 517, defining channel 505, does not extend the full length of the channel. The reason for this is to permit the attachment of carrier feed track 504 to support structure 501. The feed track consists of a strip of flat spring steel 520 and two spring steel rail strips 521 and 522. The rail strips are riveted to strip 520 by rivets 523 passing through spacers 524 to space the rails from the strip. In lieu of rivets, machine screws 525 are used at the last set of spacers to secure the track 504 to structure 501.

A drive assembly 530 is mounted adjacent track 520, and is identical to the previously described drive assembly 260 adjacent the module feed block. It consists of two plates 531 and 532 joined and separated by spacers 533. A servo motor 534 is mounted on plate 532 and has a shaft 535 on which a sprocket 536 is mounted. A second shaft 537 is mounted for rotation through the edges of plates 531 and 532 and has a collar 538, a sprocket 539 and a rubber wheel 540 mounted thereon. A belt connects sprockets 536 and 539. Wheel 540 engages the top surfaces of carriers and pushes them into channel 505. An adjustment screw 541 is located under motor 534 and functions in the same way as screw 280. Motor 534 and the drive assembly is pivoted (not shown) in the same manner as drum assembly 260 and motor 261.

Mounted over a substantial portion of support structure 501 is a plate 550 having an L-shaped slot 551 therein. Slot 551 is located directly over the channels to facilitate inspection and clearing the channels of carriers when a carrier may be jammed therein.

COMPONENT AND CARRIER ASSEMBLY

The module and carrier are assembled as a unit by an assembly mechanism generally designated as 600 shown in FIGS. 6 and 6a. The mechanism consists of a yoke 601 for guiding a slide 602 containing two blades 603 up under the point where leads 11 join module 10 to push the module up into carrier 20 as shown in FIG. 19. Yoke 601 is fastened to member 102 by means of machine screws 604 or the like. Slide 602 is essentially rectangular with flat sides 605 riding in guide slot 606. Blades 603 are secured to slide 602 by fasteners (not shown) passing through mounting plates 607 on each side of slide 602. Slide 602 has cutout portions to accommodate plates 607. The undersurface 608 of slide 602 has a threaded hole therein for receiving the threaded end of a piston rod 609 on which a lock nut 610 is mounted to securely lock the slide 602 and rod 609 together. A cylinder housing 611 is secured in any suitable fashion to the bottom 612 of yoke 601 and connects with piston rod 609 and cylinder No. 8. An aperture 613 is formed in yoke 602 above the connection with cylinder housing 611 to allow for adjustment of nut 610 and the unthreading of piston rod 609 from slide 602 for repair or disassembly.

As stated, upon activation of cylinder No. 1, the piston rod 609 forces slide 602 up and blades 603 engage under the module leads 11 as shown in FIG. 19. The blades, being thin and vertical, do not disturb the configuration of the leads. The module is forced up into carrier 20, shown in break-away perspective in FIG. 19 and the leads fit into guide slots 21 in the carrier. When the module has ment of nut 610 and the unthreading of piston rod 609 retracts returning blades 603 back to their initial position.

The component leads are shown vertical in FIG. 19 for purposes of illustration but are bent out from the vertical so that as they enter the carrier they will be bent vertical. The tendency of the resilient leads to return to the vertical assures a biased fit within the carrier.

MAGAZINE ASSEMBLY

FIG. 5 shows a cross-section of magazine No. 1. It is understood that magazine No. 2 is essentially the same and will not be separately described. The magazine assembly is generally designated as 700. Mounted on support frame 2 is a magazine socket 701 adapted to receive a magazine having an open upper end 702 and an open front face 703. Referring for a moment to FIG. 1, it is seen that there are flanges extending across the edges of the front face 703 of socket 701. These are to retain a magazine in the socket. One of the flanges 704 has a beveled inner corner 705 corresponding with a beveled corner on a magazine to insure a proper fit of the magazine within the socket. Socket 701 has a base flange 706 which is secured to support frame 2 by machine screws 707 or the like. Secured between the socket and the support frame is a mask 708. In FIG. 5, a carrier 5 loaded with a module is shown in a slot 111 of wheel 100 ready for insertion up into the magazine. Mounted in any suitable fashion on table frame A below socket 701 is a yoke 709 having a channel 710 in which a lifter 711 is positioned for vertical movement. The lifter 711 has a rectangular base 712 from which extend two blades 713. The blades 713 are positioned to pass on each side of wheel rail 118 when they are moved upwardly and into the carrier and are adapted to pass just inside of the leads 11 of the module to hit the flat and widened portions 12 of the leads where they contact the module body 10. Mounted on the base surface 714 of yoke 709 is a cylinder housing 715 which may be threaded into an aperture in yoke 709 as at 716. Extending from the cylinder is a piston rod 717 which is threadably received or force-filled into a socket 718 in the base 711 of lifter 709. A nut 719 is provided on rod 717 to securely lock the rod to the lifter base.

DRIVE

Figures 7, 8, 9:
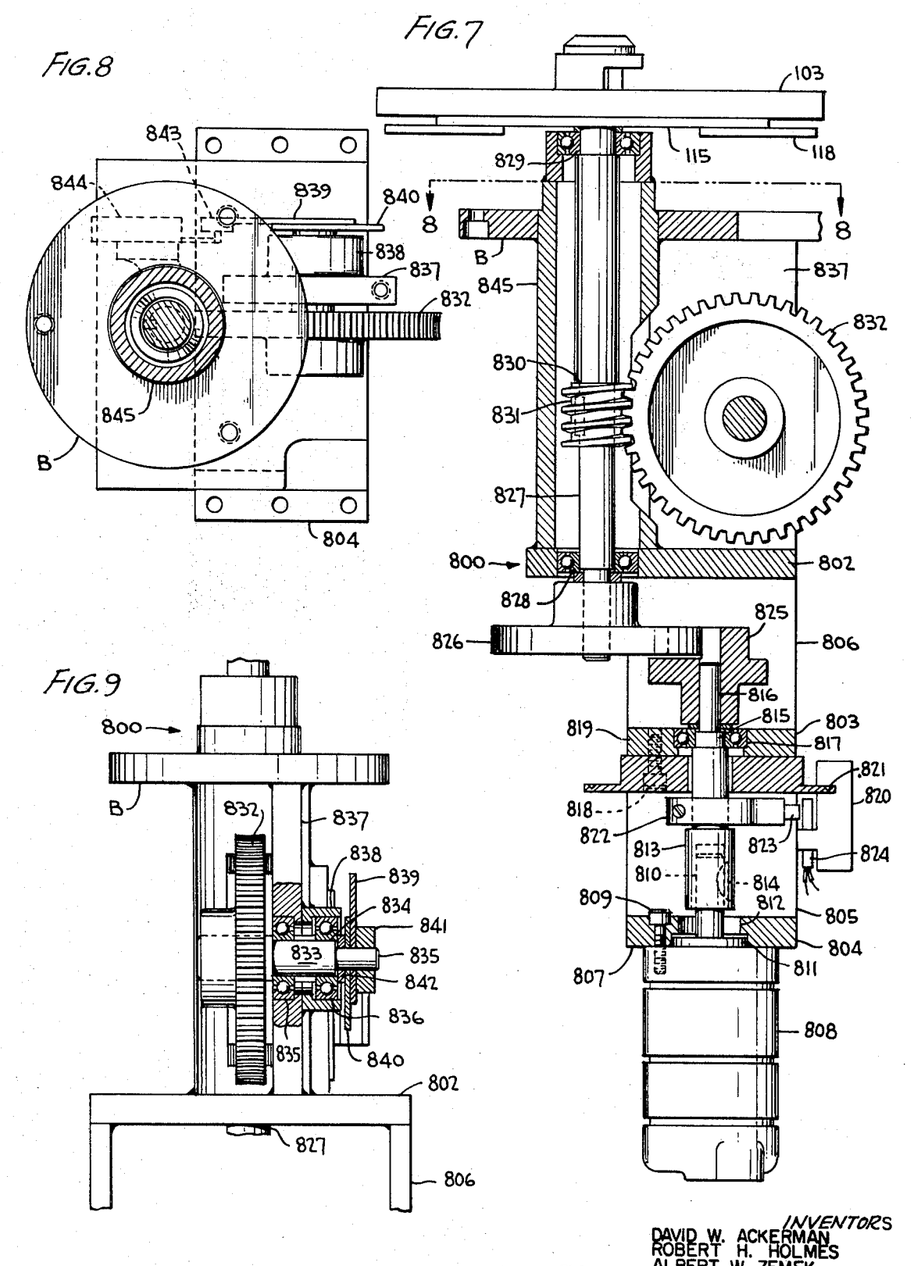
FIG. 7 is side view of a section of the drive train for the index wheel taken generally along the center line of the drive shafts.
FIG. 8 is a top plan view of the drive train shown in FIG. 7 showing the mounting plate and the timing discs and microswitch.
FIG. 9 is a partial front view of the upper portion of the gear train showing the worm gear shaft and housing in cross-section.

The drive mechanism for the index wheel 100 is shown generally as 800 in FIGS. 7, 8 and 9. The mechanism consists generally of a frame having three horizontal mounting members 802, 803 and 804. Member 803 is secured above member 804 by side mounting members 805, the side members 804 being welded to the base of member 803 and to the top surface of member 804. Member 802 is mounted on top of member 804 by two spaced frame plates 806, one of which is shown in FIG. 7. Plates 805 are welded to member 804 and secured to member 803 by means of machine screws (not shown) passing down through plate 803 into threaded holes in the top edges of plates 805. Mounted on the bottom surface 807 of member 804 is an air motor 808. Fastener screws 809 pass through member 804 into the motor housing to hold it securely to member 804. Members 803 and 804 have circular apertures therein allowing for passage of the drive shafts. Air motor 808 has a shaft 810 projecting therefrom and a flange 811 surrounding the shaft and fitted to an opening 812 in member 804. Motor shaft 810 is keyed to the hollow socket of a drive shaft 813 by means of arc-shaped key 814. Drive shaft 813 is journaled into member 803 and has a reduced portion 815 and a small diameter end shank 816. The reduced portion 815 of shaft 813 rides in a ball bearing 817 mounted in member 803. Surrounding shaft 813 and fastened to the undersurface of member 803 by machine screws 818 is mounting plate 819.

Mounting plate 819 is circular and carries switch assembly 820 on a horizontal flange 821. While only one switch assembly is shown, it is understood that several more are located around the periphery of plate 819. Clamped onto shaft 813 for rotative movement is a crank arm 822 with a permanent magnet 823 fastened on the end thereof. As the shaft 813 rotates, the magnet 823 with its accompanying magnetic field swings by and activates one of several switches 824 through the magnetic field. When the magnetic field passes adjacent switch 824 it makes or breaks a contact which in turn dictates whether a particular air valve in the pneumatic control system will open or close. Switches such as 824 are commercially available. Other suitable switching arrangements may obviously be used in lieu of them, however.

Mounted on portion 816 of the shaft 813 is a Geneva wheel 825. Rotation of wheel 825 rotates gear 826, it being understood that for every complete revolution of wheel 825, gear 826 revolves only partially, thus indexing wheel 103 in line with successive work stations every time wheel 825 rotates.

Gear 826 is secured by any suitable means onto shaft 827 which is journaled as at 828 and 829 for rotation within openings in plate 802 and a member, respectively. Member B is circular and has holes for mounting into frame A with bolts. Intermediate the ends of shaft 827 is a worm 830 keyed onto the shaft by key 831. Worm 830 drives worm gear 832 which in turn drives shaft 833. As seen in FIG. 8, shaft 833 has successively reduced diameter portions 334 and 835. Portion 834 is journaled as at 835 and 836 into vertical plate 837 and its flange portion 838. Plate 837 is mounted between member 802 and member B and fastened thereto in any suitable manner. Mounted on the end portion 835 of shaft 833 are two timing discs 839 and 840. Holding discs 839 and 840 on shaft 833 is an adjustment nut 841 and a spacer 842. The discs rotate with the shaft and engage a roller 843 on microswitch 844 shown in dotted lines in FIG. 7. Microswitch 844 is welded or otherwise secured to a circular housing 845 surrounding and enclosing shaft 827 between member B and member 802. When the timing discs engage roller 843 of microswitch 844, the switch is activated telling one of the cylinders operating the magazine ejecting mechanism to stop. The timing discs are adjusted so that after, for example, 50 loaded carriers are stacked in the first magazine, the cylinder stops operating and the index wheel 103 carries the loaded carriers to the next magazine where they are ejected into the magazine. After 50 carriers are loaded the timing discs again activate microswitch 844 thus switching off the cylinder on the second magazine and switching on the first cylinder to begin loading of the first magazine. In the alternative, the cylinder for the second magazine may operate constantly with the microswitch actuating only the cylinder for the first magazine.

Referring to FIG. 2, it is seen that shaft 827 has a hole 845 in the top end for receiving a bolt 846 which secures a cap 847 to the shaft. Cap 847 holds the flanged part 125 of index wheel 103 to shaft 827.

CONTROL SYSTEM

Figures 13, 13A, 14, 14A, 17:
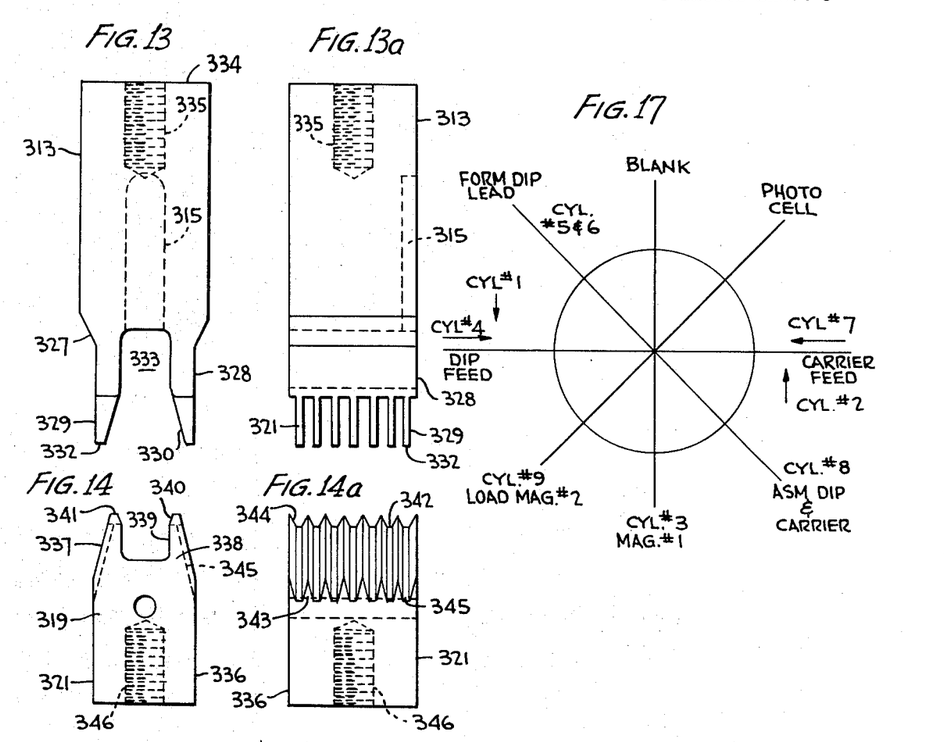
FIG. 13 is a side view of the die straightening apparatus of the forming and straightening mechanism.
FIG. 13a is a front view of the straightening die of FIG. 13.
FIG. 14 is a side view of the forming die of the forming and straightening mechanism.
FIG. 14a is a front view of the forming die of FIG. 14.
FIG. 17 is a chart indicating the relative position of the work stations and the pneumatic cylinders.
Figure 15:
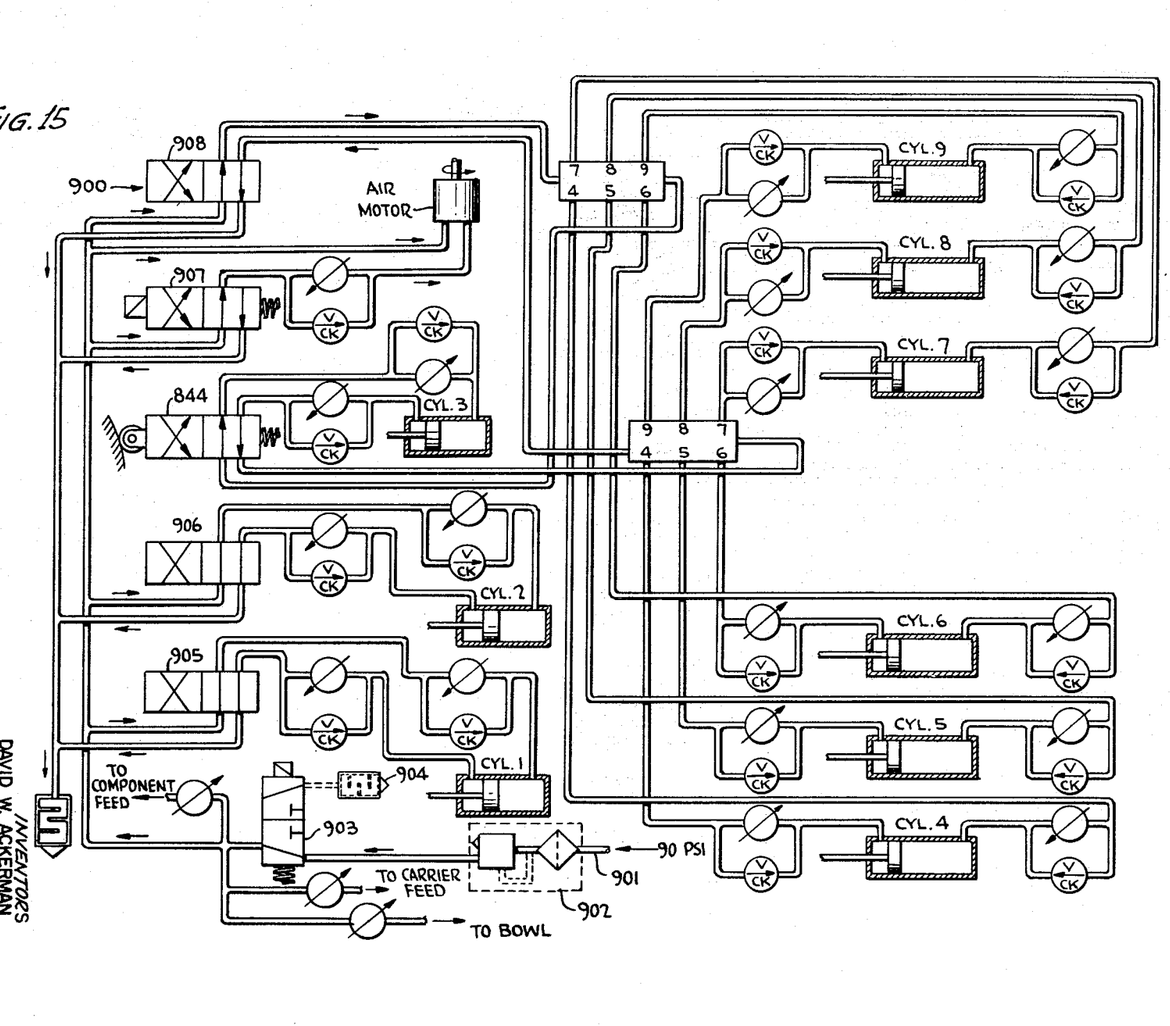
FIG. 15 is a diagrammatic view of the pneumatic control system for the work station cylinders.

The pneumatic control system is seen in FIG. 15 and is generally designated as 900. A source of compressed air enters the system as at 901 through a regulator-filter unit 902 and then passes into a dump valve 903 having an exhaust baffle 904. The air then proceeds to a carrier feed bowl (not shown or described) and the motors for the carrier and component feed track wheels, and into a series of multiple values 905, 906, 907, 908 and 844. Value 844 is the microswitch controlling the operation of cylinder No. 3 for ejecting loaded carriers into the first magazine. Valves 905, 906 and 908 are controlled by switches such as 824 and are activated by the field of permanent magnet 823 passing adjacent such switches. Valve 907, controlling the air motor 808 and rotation of index wheel 103, can either be activated by hand or through an automatic timing mechanism such as one that can be preset. Cylinder No. 1, controlling the transfer bar on the component feeding mechanism, is controlled by valve 905. Valve 906 controls the transfer slide on the carrier feed mechanism. Both of these cylinders are shown in the diagram of FIG. 15, showing the location and numbers of the various cylinders. As shown in FIG. 14, both cylinder No. 1 and cylinder No. 2 operate at different times than the remainder of the cylinders and for that reason are controlled by separate valves. Valve 908 controls the operation of cylinders 4 through 9 which operate the component and carrier feed mechanisms 200 and 500, the punch and die cylinders for the lead forming operation 300, the cylinder for the insertion mechanism 600 and the cylinder for the second magazine. As the lines are shown in FIG. 13, cylinder 9 constantly operates to clear each slot as it indexes into position. It is understood, however, that this is only one alternative arrangement for the magazine ejection cylinders.

An additional cylinder will be added to the system shown and described if the jaw holders are used to hold components on the rails 118.

OPERATION

The sequence of operations is shown in FIG. 17. As state before, there are eight (8) work stations located around the periphery of the table. The component is moved from its escapement by cylinder No. 1 into the path of feed cylinder No. 4 which pushes it onto the index table. The table then rotates clockwise to move the module to the next station where cylinders 5 and 6 operate a die and punch to straighten and form the leads of the module. The table again rotates to a blank station where it pauses and then to the photo cell station where the photo cell assembly registers whether or not a component is in position and relays that information to the next station where cylinder No. 2 may feed a unit carrier into the path of feed cylinder No. 7. The table again rotates whereupon cylinder No. 7 pushes an empty unit carrier into position over the module. The index table revolves further to the assembly station where the module is pushed up into the carrier. Further rotation brings the carrier-module unit to magazine No. 1 where it is pushed up by cylinder No. 3 and loaded into the magazine. The table again rotates to magazine No. 2 where cylinder No. 9 either acts to purge the system or does not operate at all. Cylinder No. 9 may act at times to purge the system in case a component, a carrier or a component loaded carrier has not been ejected by the system previously or has not been pushed up into magazine No. 1. In the alternative, the system may be set up so that adjustable cam plates 839 and 840 may operate either cylinder magazine No. 1 or the cylinder for magazine No. 2. The table continues to revolve until the now empty slot on the periphery of the table is in line to receive another fresh component. Of course, each slot has a module in it and for each complete revolution of the table eight loaded unit carriers are fed into one magazine or the other.

FIG. 16 shows the approximate time sequence of operation of the index table through 360° in terms of the periods during which cylinders 1–9 are activated. The illustration is only approximate, however, and it is obvious that the timing can be altered or changed. The operation of the cylinders is shown in terms of degrees of one complete rotation of the index wheel. During approximately the first 60° of rotation only cylinder No. 2, the carrier escape cylinder, is activated. As this starts to return the DIP escape cylinder No. 1 commences to operate. Around 140° of rotation, cylinders 3–9 become activated, i.e. while either magazine No. 1 or No. 2 is being loaded, the module feed cylinder No. 4 is feeding a module onto the index wheel while, simultaneously cylinders 5 and 6 are actuating die 313 and punch 321 to form the leads on a second module, a carrier is being fed by cylinder No. 7 so as to be positioned over another module and a third module is being inserted into a carrier by cylinder No. 8.

Although several specific aspects of the invention have been shown, it will be apparent to those skilled in the art that various changes and modifications may be made therein without departing from the scope of the invention as defined by the appended claims.

What is claimed is:

1. An apparatus for inserting electrical components having leads into unit carriers comprising, a frame, a movable indexing means mounted on said frame, a series of spaced receiving means on said indexing means adapted to receive unit carriers and components, a series of work station means adjacent said indexing means spaced so as to be aligned with said receiving means at any given position of the indexing means, said work station means including means to feed components and carriers to said receiving means at different indexing positions and means to insert components into unit carriers, and means for moving said indexing means a predetermined amount so as to maintain alignment of said work stations and receiving means while the components are being processed.

2. An apparatus according to claim 1 wherein the means for feeding the components and carriers comprise two individual work station feeding mechanisms.

3. An apparatus according to claim 2 wherein the mechanism for feeding unit carriers onto the indexing means comprises a housing, a means for delivering said unit carriers to the housing and an automatically controlled inserter member to push the individual unit carriers from the housing onto a selected receiving means on the indexing means.

4. An apparatus according to claim 3 wherein said housing contains an insertion channel and a transfer channel, one end of the transfer channel opening into the insertion channel, said inserter member being mounted for sliding movement in said insertion channel, said transfer channel having a piston operated slide member therein, said means for delivering unit carriers to said housing being located adjacent said transfer channel and opening into it, wherein after the unit carrier is delivered into the transfer channel, it is moved into the insertion channel by the transfer slide into position for insertion into a receiving means by the insertion member.

5. An apparatus according to claim 2 wherein the component feeding mechanism comprises a housing, an inclined slide on said housing for attaching component magazines thereto and adapted to allow a component to slide down thereon, a transverse transfer channel located at the bottom of the slide, a power operated slide bar for carrying components in said channel, an insertion channel in said housing at right angles to said transfer channel and having a power operated means to push components off the slide bar and into a slot means on said index wheel.

6. An apparatus according to claim 5 wherein said inclined slide has a raised portion on which the component body is adapted to slide with leads extending down on either side thereof, said slide bar having a raised portion of a configuration identical to that on the inclined slide and aligned therewith, a motor operated wheel mounted a predetermined distance above the inclined slide raised portion to engage said components and propel them onto the raised portion of the slide bar, said power operated means in said insertion channel consisting of an insertion slide having a longitudinally projecting extension adapted to engage a component on top of the raised portion of the transfer slide and push it into a slot means on said index wheel.

7. An apparatus according to claim 1 wherein said work station means further includes magazine means located over the peripheral edge of the indexing means and magazine insertion means which are located under said indexing means to eject component loaded carriers up into said magazine means from said receiving means.

8. An apparatus according to claim 7 where said magazine means and magazine insertion means comprise two adjacent work stations consisting of a magazine means located over the peripheral edge of the wheel and insertion means located under each magazine means, said magazine means being adapted for alternate operation whereby when one is filled the other starts filling automatically.

9. An apparatus according to claim 8 wherein the insertion means under each magazine comprises a power-operated ejection slide having a reduced width extension member thereon adapted to engage under the body of the carrier mounted component and eject the carrier and component up into the magazine.

10. An apparatus according to claim 8 wherein at least one of said insertion means comprises a vertically slideable power-operated ejection slide having a centrally located projection thereon adapted to engage the underside of the carrier loaded component and eject it from the index wheel slot means up into the accompanying magazine.

11. An apparatus according to claim 1 wherein at least one of said work station means further includes component lead forming and straightening means.

12. An apparatus according to claim 11 wherein said lead forming and straightening means comprise a lower forming member and an upper straightening member, the lower forming member adapted to act upwardly against the component leads to bend them and the upper straightening member adapted to then act downwardly against the bent leads to straighten them.

13. An apparatus according to claim 11 wherein said lead forming and straightening means includes a forming member mounted under the indexing means for upward movement to engage the leads of a component and pivotally bend them outwardly and upwardly, said member having tapered surfaces with alternate grooves and ridges in each said surface, the spacing between the ridges being equal to the spacing between the leads.

14. An apparatus according to claim 11 wherein said lead straightening and forming means includes a lead straightening vertically movable member mounted over the periphery of the indexing means for engaging the previously formed leads of a component and bending them down into an aligned posture, approximately 15 degrees off the vertical, said member having a pair of spaced downwardly projecting arms adapted to pass down over the component body on each side thereof and engage the top surfaces of the leads, said arms being slotted at their extremities to provide a plurality of tines, the facing surfaces of the two sets of tines being tapered downwardly to enable the entire tapered surfaces of the tines to engage the angularly bent leads along their length.

15. An apparatus according to claim 1 wherein a cam plate is mounted to the frame over the indexing means for nonrotative movement, said cam plate having a cam track means therein, each receiving means on the indexing means having a radial track, a means to hold components slideably positioned in each track, said holding means having follower means engaged with said cam track means, said cam track means being configurated so as to allow the holding means to engage the components only over a partial arcuate segment of the rotation of said indexing means whereby the components are held in place on the indexing means at some work stations and are not at others.

16. An apparatus according to claim 15 wherein said holding means are slides and said follower means are projections, and said cam track is a continuous channel on the undersurface of said cam plate, said projections riding in said channel, one portion of said channel being circular and equally distant from the center of rotation of said indexing means and the remaining portion extending further away from said center of rotation.

17. An apparatus according to claim 16 and including control means for operating selected work station means, timing means on said gear train means, switch means operatively associated with said control means, said timing means being adapted to activate the switch means.

18. An apparatus according to claim 1 wherein said inserting means includes a power operated insertion member adapted to thrust a component into a unit carrier.

19. An apparatus according to claim 18 wherein said insertion member has a pair of spaced thin walled projecting arms adapted to pass upward on each side of the component and engage that portion of the leads adjacent the component body and to push the component up into the unit carrier.

20. An apparatus according to claim 1 wherein said work station means includes a sensing means adapted to deactivate the carrier feeding means when there is no component in the receiving means aligned with said sensing means.

21. An apparatus according to claim 20 wherein said sensing means consists of a photocell assembly mounted over and under the edge of said indexing means.

22. An apparatus according to claim 1 including an air source and air pressure sensing means wherein the frame supporting the indexing means has air holes located at several work stations under the periphery of the wheel whereby the back pressure produced by a component being in the slot means activates the pressure sensing means which is adapted to activate the valve controlling the operation of selected work station.

23. An apparatus according to claim 1 including a pneumatic control system, said carrier and component feeding means and said insertion means being powered by pneumatic cylinders, means for timing the operations of the pneumatic cylinders at the work stations, said timing means and operation of the pneumatic control system being controlled by the means for rotating the indexing means.

24. An apparatus according to claim 23 wherein said indexing means comprises a circular plate and said receiving means include slots in the peripheral edge of said plate.

25. An apparatus for continually inserting electrical components having a body and dual parallel lead extending from opposite sides thereof into a unit carrier, said apparatus comprising:
 (a) a frame means,
 (b) means on said frame for progressively moving individual components and carriers to a common position,
 (c) means for feeding components onto said moving means,
 (d) means for feeding carriers onto said moving means, and
 (e) means for inserting said components into said carriers at said common position.

26. An apparatus according to claim 25 including:
 (f) a magazine means, and
 (g) means for feeding said loaded carriers into said magazine means.

27. An apparatus according to claim 25 including:
 (f) two magazines mounted over said moving means adjacent each other,
 (g) first and second insertion means for feeding loaded carriers into said magazines, and
 (h) a timing means for allowing said first insertion means to fill one of said magazines then rendering it inoperative to allow the second insertion means to feed the other magazine while the filled magazine is being replaced with an empty one.

28. An apparatus according to claim 25 wherein said moving means comprises:
 ($b_1$) a circular index wheel mounted in said frame means,
 ($b_2$) drive means for continually turning said index wheel by selected angular increments.

29. An apparatus according to claim 28 further including:
 ($b_3$) eight retaining means on the periphery of said index wheel, and
 ($b_4$) said retaining means being equally spaced around the periphery of the wheel.

30. An apparatus according to claim 25 and further including:
 (f) a component lead forming and straightening means whereby the leads of the components are straightened prior to inserting the component in a carrier.

31. An apparatus according to claim 30 and further including:
 (g) slot means on said moving means to hold said components and carriers during movement thereof,
 (h) holdown means for retaining said components in said slot means during the forming and straightening operation, and
 (i) a camming means adapted to advance said holdown means prior to the straightening operation and to retract it after said operation.

32. An apparaus for inserting dual in-line lead components into unit carriers, said apparatus comprising a frame, an index wheel mounted on said frame for rotary movement with retaining means to receive said components and carriers, a plurality of work stations around the periphery of said wheel, said work stations including means for feeding components and carriers into said retaining means, and a means for inserting said components into unit carriers.

33. An apparatus as in claim 32 wherein said index wheel has retaining means thereon for retaining means therein for retaining the components and carriers in place.

34. An apparatus as in claim 33 wherein said retaining means includes substantially rectangular slots equally spaced around the peripheral edge of the index wheel, said wheel having a flange portion on the bottom thereof, rail means mounted on the flange portion and extending radially beneath said slots to provide a support for said components, said slots having edge means at the base thereof for supporting unit carriers, whereby said wheel is adapted to hold unit carriers directly above the rail-mounted components prior to insertion.

35. An apparatus as in claim 33 and further including a holddown means for securing said components against movement, a cam means, said cam means adapted to operate the holddown means, whereby said holddown means operates only at least one work station.

36. A process for inserting dual in-line package electrical components into unit carriers comprising providing an electrical component, providing a unit carrier directly adjacent and in line with said component, applying a force to said component to position and load it within said carrier and applying a further force to position the loaded unit carrier within a magazine.

37. A process as in claim 36 and including the preliminary step of applying a force to bend the component leads patrially outward to a position where the leads on each side of the component body are parallel and then bending them back to a position where each set of leads are parallel whereby all the leads are parallel to each other.

38. A process as in claim 36 wherein force is applied solely to the component body along the base of the leads adjacent the body so as not to injure the body or the alignment of the leads.

References Cited
UNITED STATES PATENTS

| | | | |
|---|---|---|---|
| 3,333,673 | 8/1967 | Zemek | 29—203X |
| 3,429,039 | 2/1969 | Berg | 29—626 |
| 3,488,672 | 1/1970 | Martyn | 29—626 |

THOMAS H. EAGER, Primary Examiner

U.S. Cl. X.R.

29—626